(12) United States Patent
Sakagami (10) Patent No.: US 7,234,152 B2
(45) Date of Patent: Jun. 19, 2007

(54) DISK PLAYER

(75) Inventor: Katsuya Sakagami, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 442 days.

(21) Appl. No.: 10/860,281

(22) Filed: Jun. 4, 2004

(65) Prior Publication Data

US 2005/0015787 A1    Jan. 20, 2005

(30) Foreign Application Priority Data

Jun. 6, 2003   (JP)   ............. P2003-161529

(51) Int. Cl.
*G11B 17/04*   (2006.01)
(52) U.S. Cl. ............. 720/613; 720/601; 720/622
(58) Field of Classification Search ............. 720/601, 720/607, 610, 611, 613, 622, 637, 641, 692, 720/603, 651
See application file for complete search history.

(56) References Cited

U.S. PATENT DOCUMENTS 6,160,780 A * 12/2000 Furukawa et al. .......... 720/604
2001/0021155 A1 * 9/2001 Saito ................. 369/75.1
2002/0024910 A1 * 2/2002 Shiomi ............... 369/75.2
2004/0143837 A1 * 7/2004 Kim .................. 720/611

FOREIGN PATENT DOCUMENTS

JP    2003-16712    1/2003

* cited by examiner

*Primary Examiner*—Wayne Young
*Assistant Examiner*—Abdukader Muhammed
(74) *Attorney, Agent, or Firm*—Morgan, Lewis & Bockius LLP (57) ABSTRACT

In guide grooves formed at both side edges of a lower face of a tray and fitted to a pair of left and right guide members of a cabinet, the guide groove substantially in a U-like shape on one side is inserted with a front end portion of an elastic plate integrally projected at a front portion of the cabinet, a recess portion is formed at a portion of one side face of the guide groove 12 opposed to the elastic plate in a state of containing the tray into the cabinet, and formed such that by bringing the one side face of the guide groove 12 into elastic contact with the elastic plate opposed to the recess portion in moving the tray forward, other side face of the guide groove is brought into contact with reference guide faces of the guide member on one side to thereby prevent the tray from being inclined.

6 Claims, 10 Drawing Sheets

PRIOR ART

FIG. 12B

PRIOR ART

DISK PLAYER

BACKGROUND OF THE INVENTION

1. Field of the Invention

The present invention relates to a disk player for reproducing, recording or erasing an optical disk or a photomagnetic disk (hereinafter, abbreviated as disk) of DVD RW or the like.

2. Description of the Related Art

Figure 12A:
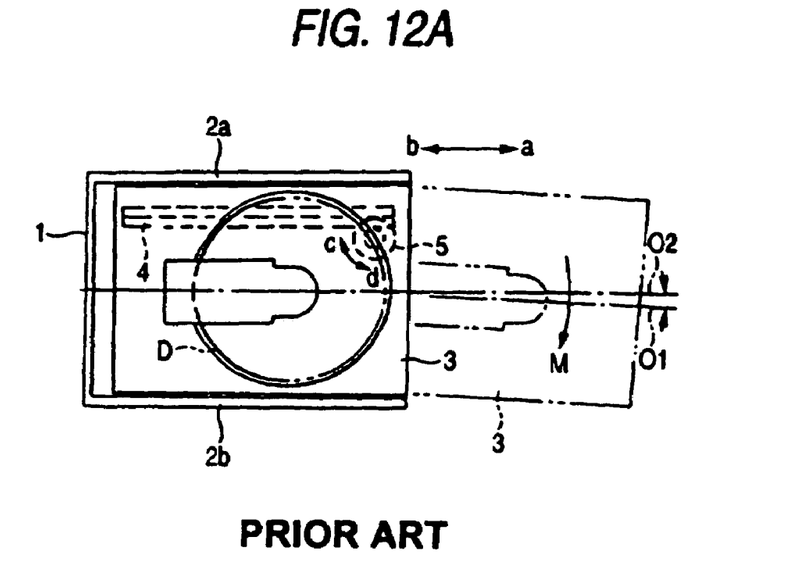
FIGS. 12A and 12B are outline plane views showing a prior art.

There is a prior art disk player disclosed in JP-A-2003-16712. According to the disk player, as shown by FIG. 12A, a tray 3 made of a synthetic resin for a disk D is arranged to be movable forward and rearward a, b between side plate portions 2a, 2b of a cabinet 1 made of a synthetic resin, a rack 4 is formed at a vicinity of one side edge of a lower face of the tray 3 along a direction of forward and rearward a, b, a pinion 5 rotatable regularly and reversely c, d is provided at the cabinet 1 to be opposed to the rack 4, the tray 3 is moved forward a by rotating the pinion 5 regularly c based on an unloading signal, at this occasion, as shown by imaginary lines, the tray 3 is moved forward a while being inclined by a rotational force M of the pinion 5 in a direction of rotating regularly c, and a center axis O1 of the tray 3 is positionally shifted from a center axis O2 of the cabinet 1 creating an undesirable appearance. Further, when the tray 3 is moved rearward b based on a loading signal, inclination of the tray 3 is corrected and in correcting the inclination, the tray 3 is rocked or emits an undesirable noise.

Figure 12B:
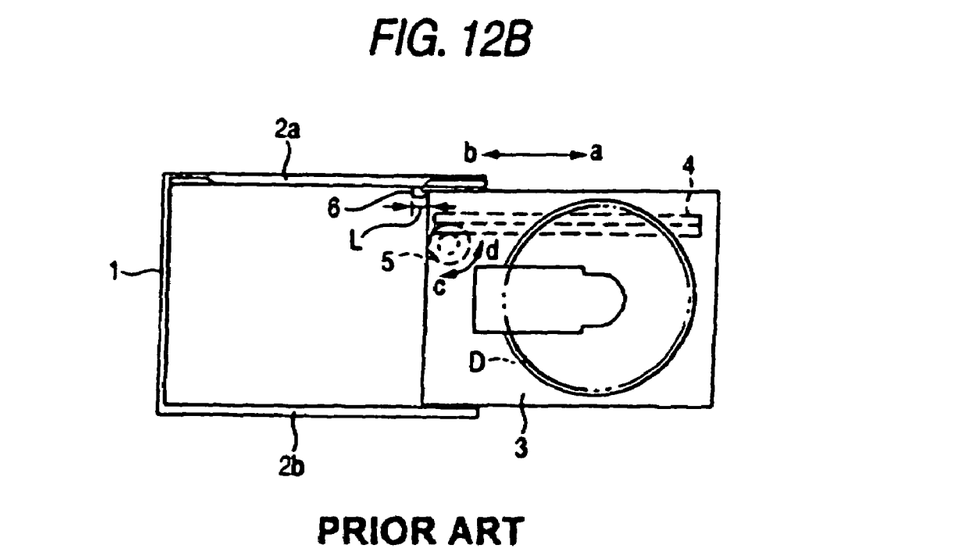

Hence, as shown by FIG. 12B, there is provided an elastic plate 6 extended rearward from a rear end of one side edge of the tray 3 and opposed to side plate 2a of the cabinet 1, and a front end portion of the elastic plate 6 is brought into elastic contact with side plate portion 2a in moving the tray 3 forward a to thereby prevent the tray 3 from being inclined.

According to the above description of the prior art, since the elastic plate 6 is extended rearward from the rear end of the one side edge of the tray 3, when a rear end of the tray 3 is inserted into the cabinet 1 while swinging in a left and right direction in an integrating step of a factory, there is a concern that the elastic plate 6 will impact the side plate portion 2a or the like of the cabinet 1 resulting in damage, and when the elastic plate 6 is damaged, tray 3 may have to be replaced. Further, the cabinet 1 needs to be longer than the tray 3 by an amount of a length L of the elastic plate 6 and therefore, there is also the disadvantage of a larger disk player.

SUMMARY OF THE INVENTION

It is an object of the invention to provide a disk player achieving a reduction in cost and size and having a tray that moves forward and rearward linearly.

According to a first aspect of the invention, a disk player in which a tray made of a synthetic resin is arranged to be moveable in forward and rearward directions between side plate portions of a cabinet made of a synthetic resin. An elastic plate extended rearward from a rear end of one side edge of the tray and opposed to one side plate portion of the cabinet is provided. A rack is formed at a vicinity of one side edge of a lower face of the tray along forward and rearward directions. A pinion is provided at the cabinet to be opposed to the rack, the tray is moved forward by rotating the pinion via the rack based on an unloading signal, and a front end portion of the elastic plate is brought into elastic contact with the side plate portion of the cabinet in accordance therewith to thereby prevent the tray from being inclined, wherein an elastic plate is integrally projected at a front side lateral beam portion in two forward and rearward lateral beam portions integrally formed between the side plate portions of the cabinet in place of the elastic plate provided at the tray. The elastic plate is formed substantially in a J-like shape, a projected portion in a shape of a circular arc is integrally projected at a side face of the front end of the elastic plate, in guide grooves formed at the side edges of a lower face of the tray and fitted to a pair of left and right guide members of the cabinet. The projected portion in the shape of the circular arc is inserted into one of the guide grooves formed substantially in a U-like shape. A recess portion is formed at a portion of one side face of the one guide groove opposed to the projected portion in the shape of the circular arc in a state of containing the tray into the cabinet, by bringing the one side face of the one guide groove into elastic contact with the projected portion in the shape of the circular arc opposed to the recess portion in moving forward the tray. The other side face of the guide groove is formed such that the tray is not inclined by being brought into contact with a reference side face of one guide member, in a plurality of guide pieces forming the respective guide members and aligned along the forward and rearward direction. The front end faces of the guide pieces at rearmost ends are positionally shifted from each other along the forward and rearward directions, and reference side faces of the guide pieces at the rearmost ends are inclined to separate from the side faces of the guide grooves in a forward direction.

According to the first aspect, the recess portion formed at the one face of the one guide groove is opposed to the projected portion in the circular arc shape of the elastic plate, since the elastic plate is not applied with a load, there is not a concern of reducing an elastic force of the elastic.

When the tray is moved forward, one side face of one guide groove is brought into elastic contact with the projected portion in the circular arc shape, the other side face of the guide groove is brought into contact with the reference side face of one guide member, the tray can be moved forward along the reference side face such that the tray is not inclined and the appearance is improved.

The elastic plate is integrally projected at the front side lateral beam portion, by inserting the rear end of the tray into the cabinet in an integrating step during manufacture. The projected portion in the circular arc shape of the elastic plate can immediately be inserted into the guide groove and therefore, when the tray is inserted into the cabinet by swinging in a left and right direction, there is not a concern of damaging or bending the elastic plate to reduce the elastic force as in the prior art.

Since the elastic plate is integrated into the cabinet, the disk player can be downsized by shortening the cabinet.

The other face of the guide groove is brought into contact with the reference side face of one guide member by the elastic force of the elastic plate, the tray is shifted laterally and therefore, rear end edges of the tray moving rearward are brought into contact with front end faces of the guide pieces at rearmost ends and there is a concern of hampering a tray from being contained into the cabinet, however, according to the invention, front end faces of the guide pieces at the rearmost ends are positionally shifted from each other along a forward and rearward moving direction and therefore, the rear end edges of the tray moving rearward are not simultaneously brought into contact with the front end faces of the guide pieces at the rearmost ends, the tray can smoothly be moved rearward, the reference side faces of the guide pieces at the rearmost ends are inclined to separate from the side faces of the guide grooves in the forward direction and therefore, the tray can smoothly be contained in the cabinet.

Since the elastic plate is formed substantially in the J-like shape, by bringing the projected portion in the circular arc shape of the elastic plate into contact with the one side face of the one guide groove, the predetermined elastic force is produced by totally bending the elastic plate and the tray can linearly be moved forward and rearward by the elastic force such that the tray is not inclined.

By integrally projecting the projected portion in the circular arc shape at the side face of the front end of the elastic plate, the front end portion of the elastic plate is thickened and therefore, the elastic force can firmly be transmitted from the elastic plate to the tray via the thickened front end portion. By bringing the circular arc face of the projected portion in the circular arc shape into point contact with the tray, the contact resistance can be reduced and therefore, there is not a concern that the projected portion in the circular arc shape constitutes a significant hazard in moving the tray forward and rearward and the tray can smoothly be moved forward and rearward.

According to a second aspect of the invention, in a disk player in which a tray made of a synthetic resin is arranged movably forward and rearward between both side plate portions of a cabinet made of a synthetic resin, a rack is formed at a vicinity of one side edge of a lower face of the tray along a forward and rearward direction, a pinion is provided at the cabinet to be opposed to the rack, and the tray is moved forward by rotating the pinion via the rack based on an unloading signal, wherein in both guide grooves formed at both side edges of the lower face of the tray and fitted to a pair of left and right guide members of the cabinet, a front end portion of the elastic plate integrally projected at a front portion of the cabinet is inserted into the one guide groove formed substantially in a U-like shape, a recess portion is formed at a portion of one side face of the one guide groove opposed to the elastic plate in a state of containing the tray into the cabinet, and by bringing one side face of the one guide groove into elastic contact with the elastic plate opposed to the recess portion in moving forward the tray, the other face of the guide groove is brought into contact with a reference side face of the one guide member to prevent the tray from being inclined.

According to the above-described aspect of the invention, in the state of containing the tray in the cabinet, the recess portion formed at the one side face of the one guide groove is opposed to the elastic plate, the elastic plate is not applied with a load and therefore, there is not a concern of reducing the elastic force of the elastic plate.

Further, when the tray is moved forward, the one side face of the one guide groove is brought into elastic contact with the elastic plate, the other side face of the guide groove is brought into contact with the reference side face of one guide member by the elastic force of the elastic plate and therefore, the tray can be moved forward along the reference side face such that the tray is not inclined and the appearance is improved.

Further, the elastic plate is integrally projected at the front portion of the cabinet, by inserting the rear end of the tray into the cabinet in an integrating step of manufacturing, the front end portion of the elastic plate is immediately inserted into the one guide groove and therefore, when the tray is inserted into the cabinet while swinging in a left and right direction, there is not a concern of damaging or bending the elastic plate to reduce the elastic force as in the prior art.

Further, since the elastic plate is integrated into the cabinet, the disk player can be downsized by making a length of the cabinet shorter.

According to a third aspect of the invention, in the plurality of guide pieces forming the respective guide members and aligned along the forward and rearward direction, front end faces of the both guide pieces at rearmost ends are positionally shifted from each other along the forward and rearward direction.

According to the above-described aspect of the invention, the other side face of the guide groove is brought into contact with the reference side face of one guide member by the elastic force of the elastic plate, the tray is shifted laterally and therefore, rear end edges of the tray moving rearward are brought into contact with front end faces of the both guide pieces at rearmost ends and there is a concern that the tray is hampered from being contained into the cabinet, however, according to the invention, front end faces of the both guide pieces at the rearmost ends are shifted from each other along the forward and rearward moving direction and therefore, the rear end edges of the tray moving rearward are not simultaneously brought into contact with the front end faces of the both guide pieces at the rearmost ends and the tray can smoothly be moved rearward.

According to a fourth aspect of the invention, the reference side faces of the both guide pieces at the rearmost ends are inclined to separate from the side faces of the guide grooves in a forward direction.

According to the above-described aspect of the invention, the reference side faces of the both guide pieces at the rearmost ends are inclined to separate from the side faces of the guide groove in the forward direction and therefore, the tray can smoothly be contained into the cabinet.

According to a fifth aspect of the invention, the elastic plate is formed substantially in a J-like shape.

According to the above-described aspect of the invention, since the elastic plate is formed substantially in the J-like shape, by bringing the front end of the elastic plate into contact with the one side face of the one guide groove, the predetermined elastic force is produced by totally bending the elastic plate and the tray can linearly be moved forward and rearward by the elastic force such that the tray is not inclined.

According to a sixth aspect of the invention, a projected portion in a shape of a circular arc is integrally projected at a side face of a front end of the elastic plate and the one side face of the one guide groove is brought into elastic contact with a circular arc face of the projected portion in the shape of the circular arc.

According to the above-described aspect of the invention, by integrally projecting the projected portion in the circular arc shape at the side face of the front end of the elastic plate, the front end portion of the elastic plate is thickened and therefore, the elastic force can firmly be transmitted from the elastic plate to the tray via the thickened front end portion, the contact resistance is reduced by bringing the circular arc face of the projected portion in the circular arc shape into point contact with the tray and therefore, there is not a concern that the projected portion in the circular arc shape constitutes a significant hazard in moving the tray forward and rearward and the tray can smoothly be moved forward and rearward.

DESCRIPTION OF THE PREFERRED EMBODIMENTS

Figure 1:
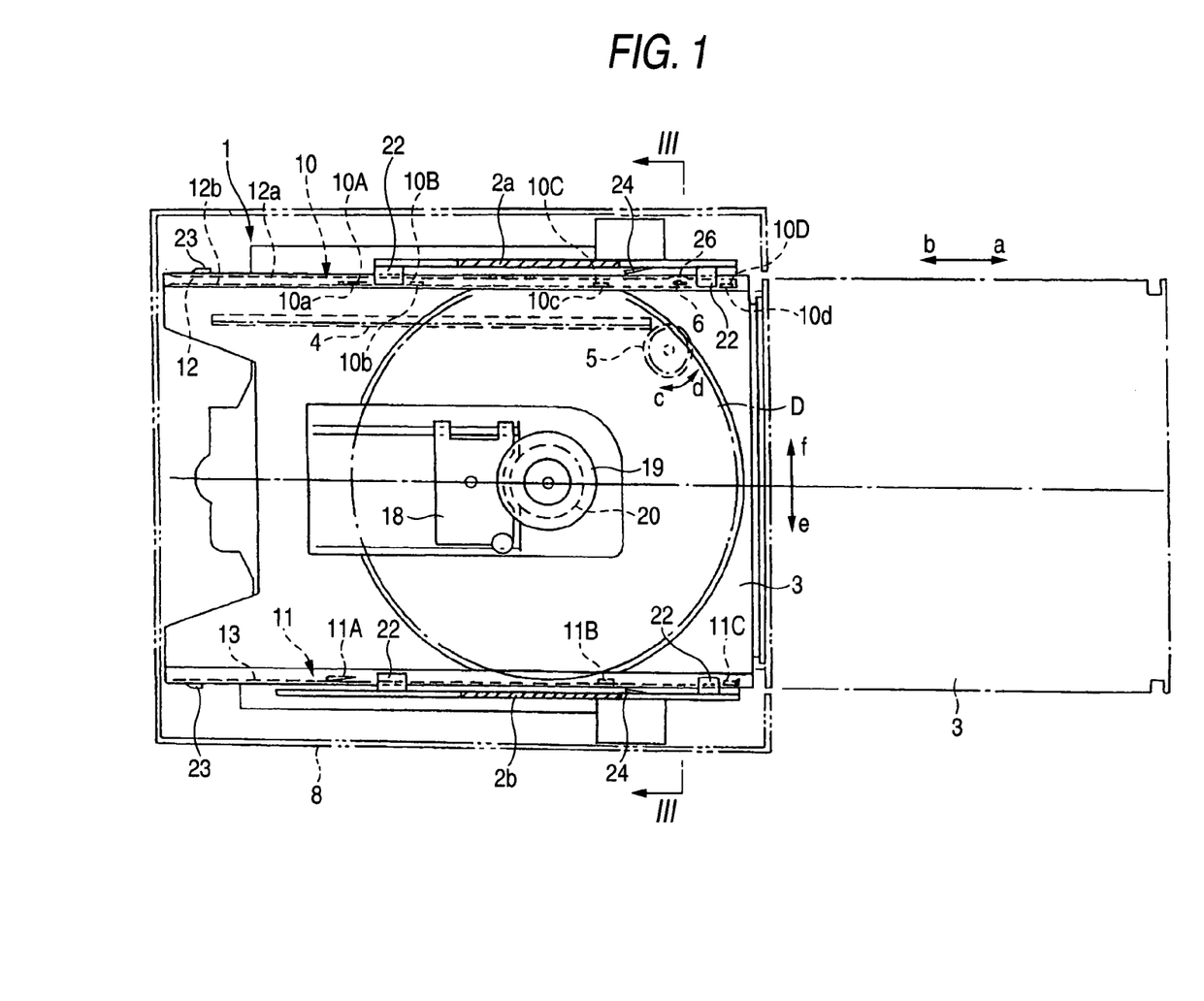
FIG. 1 is a plane view of a disk player according to an embodiment of the invention.

FIG. 1 through FIG. 5 show a disk player according to an embodiment of the invention. Receiving bases 9 are provided at both side plate portions 2a, 2b of a cabinet 1 made of a synthetic resin arranged in a casing 8. The receiving bases 9 are provided with left and right guide members 10, 11 comprising pluralities of guide pieces 10A through 10D, 11A through 11C aligned at predetermined intervals in a direction of forward and rearward a, b. Guide grooves 12 substantially in a U-like shape and guide grooves 13 formed substantially in a U-like shape and formed at both side edges of a lower face of a tray 3 made of a synthetic resin are respectively fitted to the respective guide members 10, 11. A pair of front and rear lateral beam portions 14a, 14b are hung between the side plate portions 2a, 2b of the cabinet 1. A rectangular through hole 15 penetrates to a portion of the front side lateral beam portion 14a opposed to the guide groove 12. A front end of an elastic plate 6, a base end portion of which is integrally projected to a side edge of the through hole 15, is inserted into the guide groove 12, and a recess portion 26 is formed at a portion of one side face 12a of the guide groove 12 opposed to the elastic plate 6 to contain the tray 3 within the cabinet 1 (refer to FIG. 1). Further, in FIG. 2, numeral 16 designates a pivotable drive chassis centering on a pivoting shaft 17, mounted with an optical pickup 18 and a spindle motor 20 having a turn table 19. A cam plate 21 is slidably arranged at the front side lateral beam portion 14a of the cabinet 1 along a transverse direction e, f orthogonal to the frontward and rearward direction a, b, and a cam pin 16a projected at a front end of the drive chassis 16 is fitted into a cam hole 21a formed at the cam plate 21. In FIG. 1, numeral 22 designates tray float up preventing pieces, numeral 23 designates draw out preventing pieces projected at rear ends of the both side edges of the tray 3, and stoppers 24 are projected at the both side plate portions 2a, 2b to be opposed to the respective draw out preventing pieces 23. Note that components in FIGS. 1–5 that correspond to components in FIGS. 12A and 12B have the same reference number.

Figure 6:
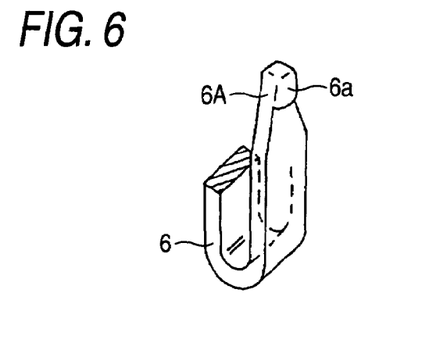
FIG. 6 is a perspective view of an elastic plate of the same.
Figure 7:
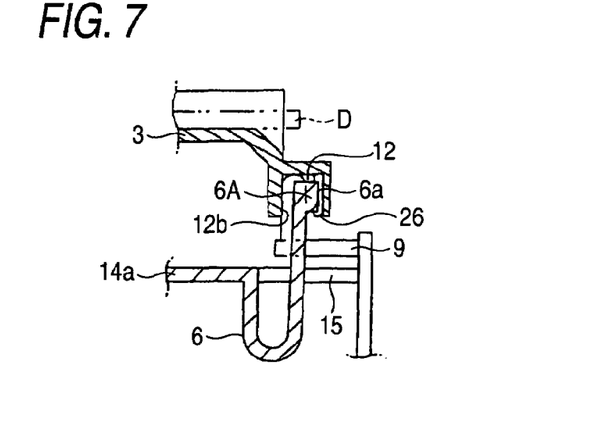
FIG. 7 is a cross-sectional view of a state of making the elastic plate opposed to a recess portion.
Figure 8:
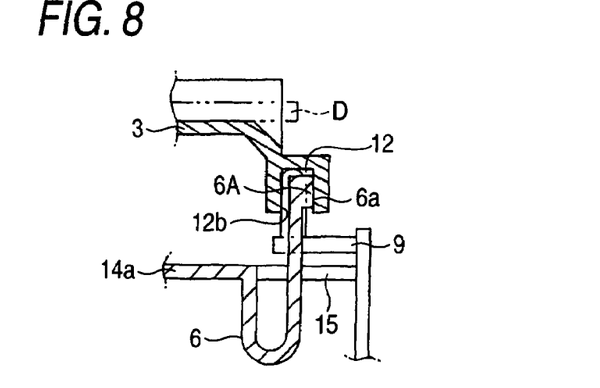
FIG. 8 is a cross-sectional view of a state of bringing the elastic plate into contact with a side face of a guide groove.
Figure 10:
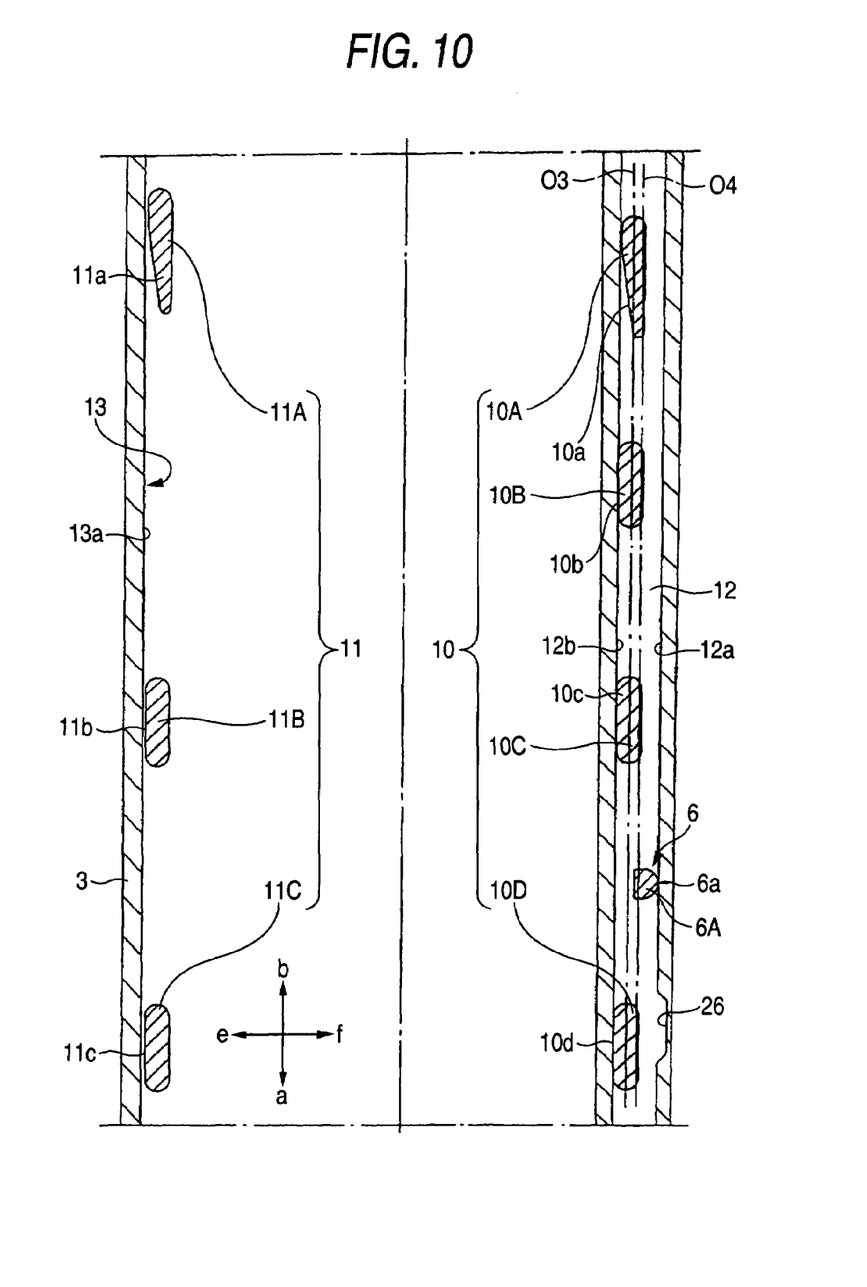
FIG. 10 is an outline horizontal sectional view of a state of slightly moving the tray forward.

As shown by FIG. 6 through FIG. 8, the elastic plate 6 is formed substantially in a J-like shape, a projected portion 6A in a shape of a circular arc is integrally projected at a side face of a front end in a converging shape thereof, by elastically pressing a circular arc face 6a of the projected portion 6A in the circular arc shape to the one side face 12a of the guide groove 12 substantially in the U-like shape, other side face 12b of the guide groove 12 substantially in the U-like shape is brought into contact with reference side faces 10a through 10d of the guide pieces 10A through 10D on one side and a side face 13a of the guide groove 13 substantially in the L-like shape is made to be proximate to or brought into contact with reference side faces 11a through 11c of the guide pieces 11A through 11C on other side (refer to FIG. 10).

According to the description above, since the elastic plate 6 is formed substantially in the J-like shape, by bringing the projected portion 6A in the circular arc shape of the elastic plate 6 into contact with the one side face 12a of the guide groove 12 substantially in the U-like shape, the elastic plate 6 is bent totally to produce a predetermined elastic force and the tray 3 can be moved forward and rearward a, b linearly such that the tray 3 is not inclined by the elastic force.

Further, by integrally projecting the projected portion 6A in the circular arc shape at the side face of the front end of the elastic plate 6, a front end portion of the elastic plate 6 is thickened and therefore, the elastic force can firmly be transmitted from the elastic plate 6 to the tray 3 via the thickened front end portion, by bringing the circular arc face 6a of the projected portion 6A in the circular arc shape into point contact with the tray 3, a contact resistance thereof is reduced and therefore, there is not a concern that the projected portion 6A substantially in the circular arc shape constitutes a significant hazard in moving the tray 3 forward and rearward a, b, and the tray 3 can smoothly be moved forward and rearward a, b.

Further, the elastic plate 6 is integrally projected at the front side lateral beam portion 14a of the cabinet 1, by inserting the rear end of the tray 3 into the cabinet 1 in the integrating step in the factory, the projected portion 6A in the circular arc shape of the elastic plate 6 is immediately inserted into the guide groove 12 substantially in the U-like shape of the tray 3 and therefore, when the tray 3 is inserted into the cabinet 1 by swinging in the left and right direction, there is not a concern that the elastic plate 6 is damaged or bent to reduce the elastic force as in the prior art.

Figure 2:
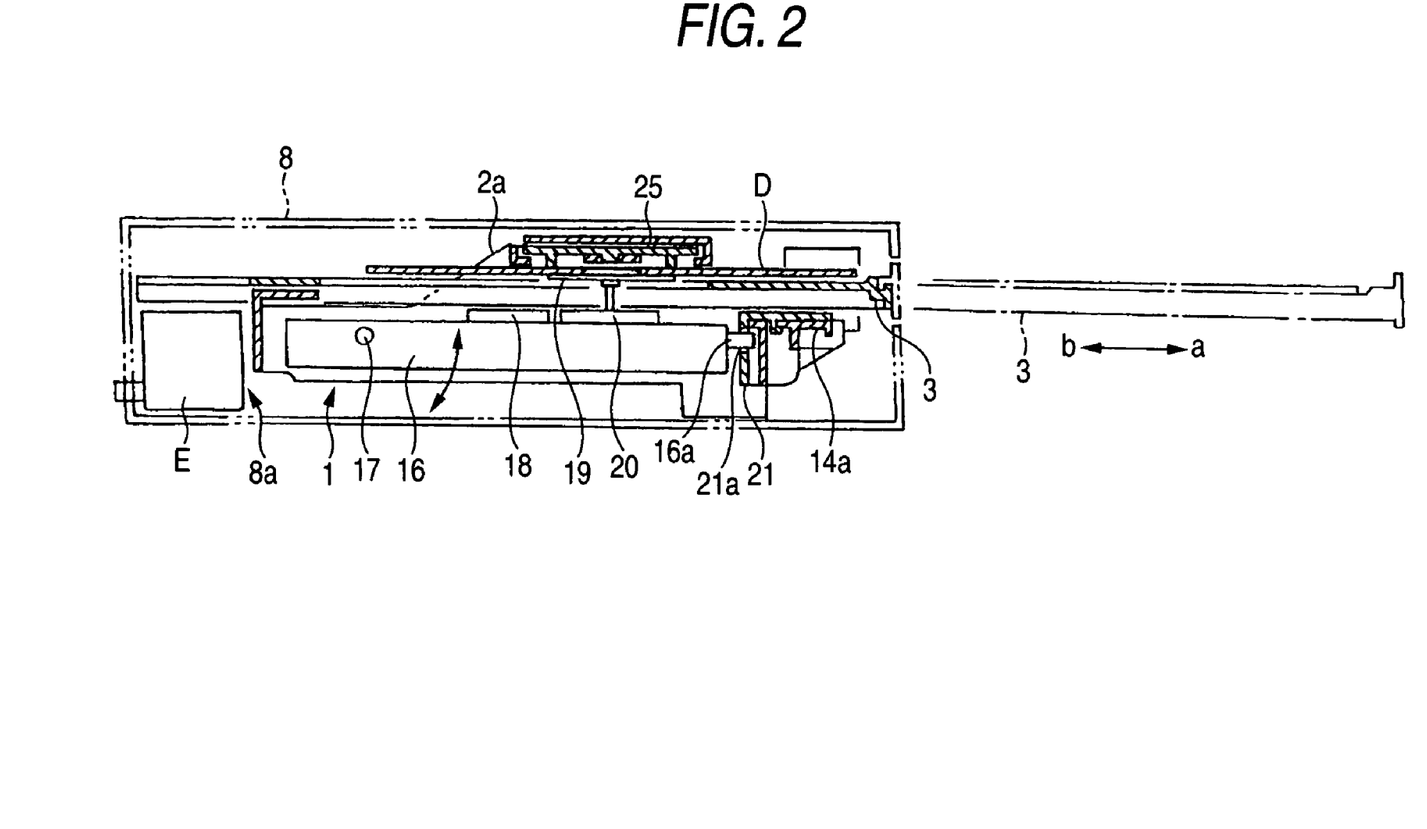
FIG. 2 is a vertical sectional view thereof.
Figure 3:
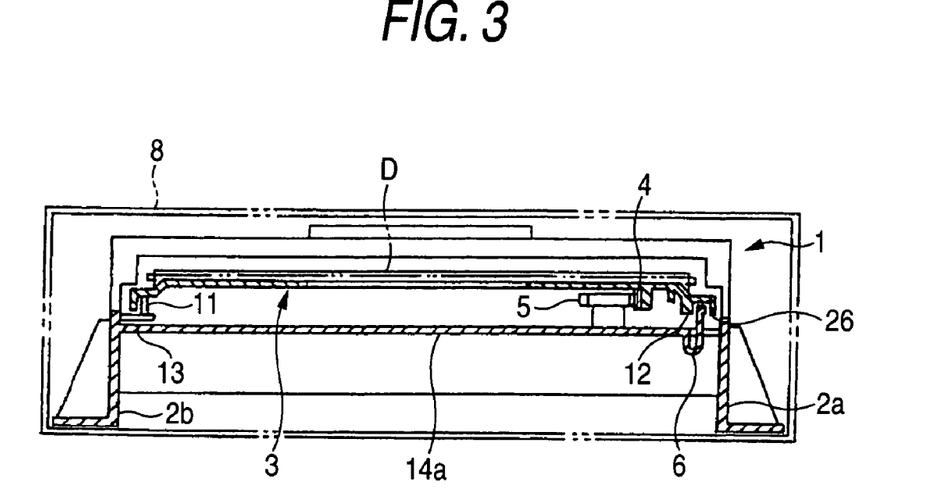
FIG. 3 is a view taken along a line III—III of FIG. 1.
Figure 4:
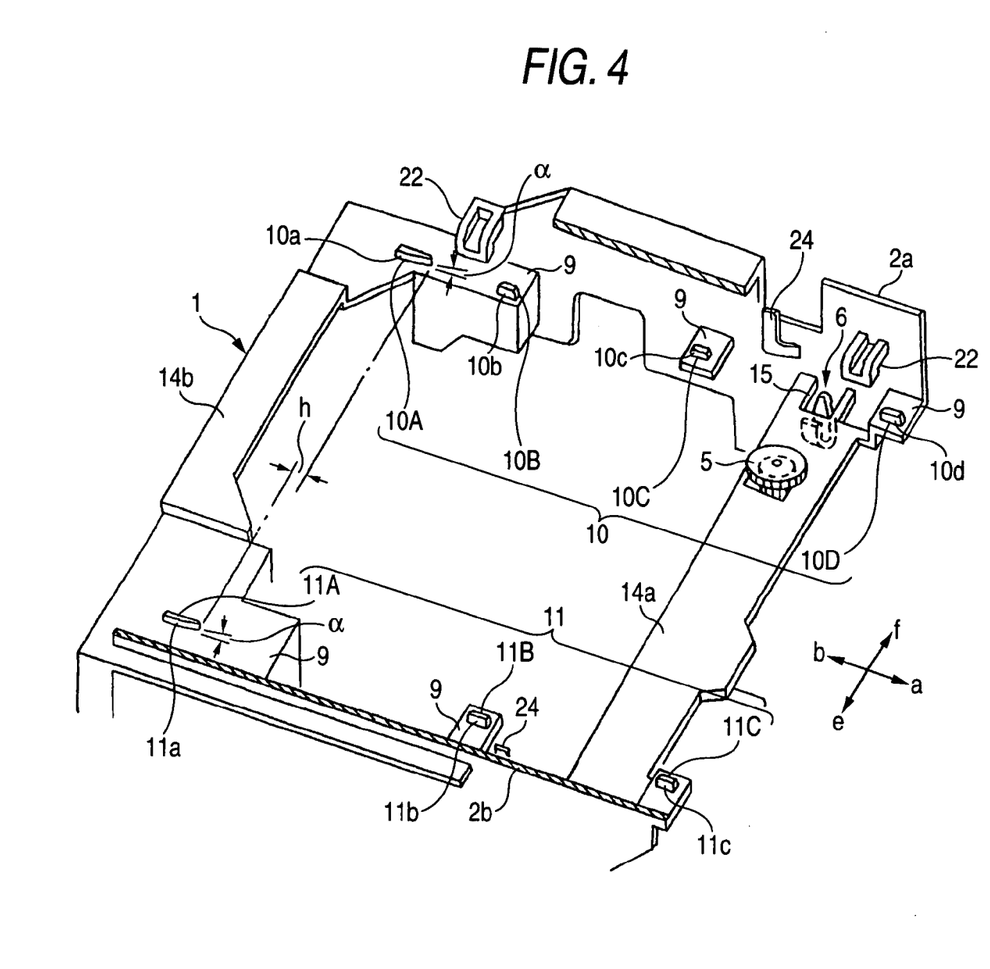
FIG. 4 is a perspective view of a cabinet of the same.
Figure 5:
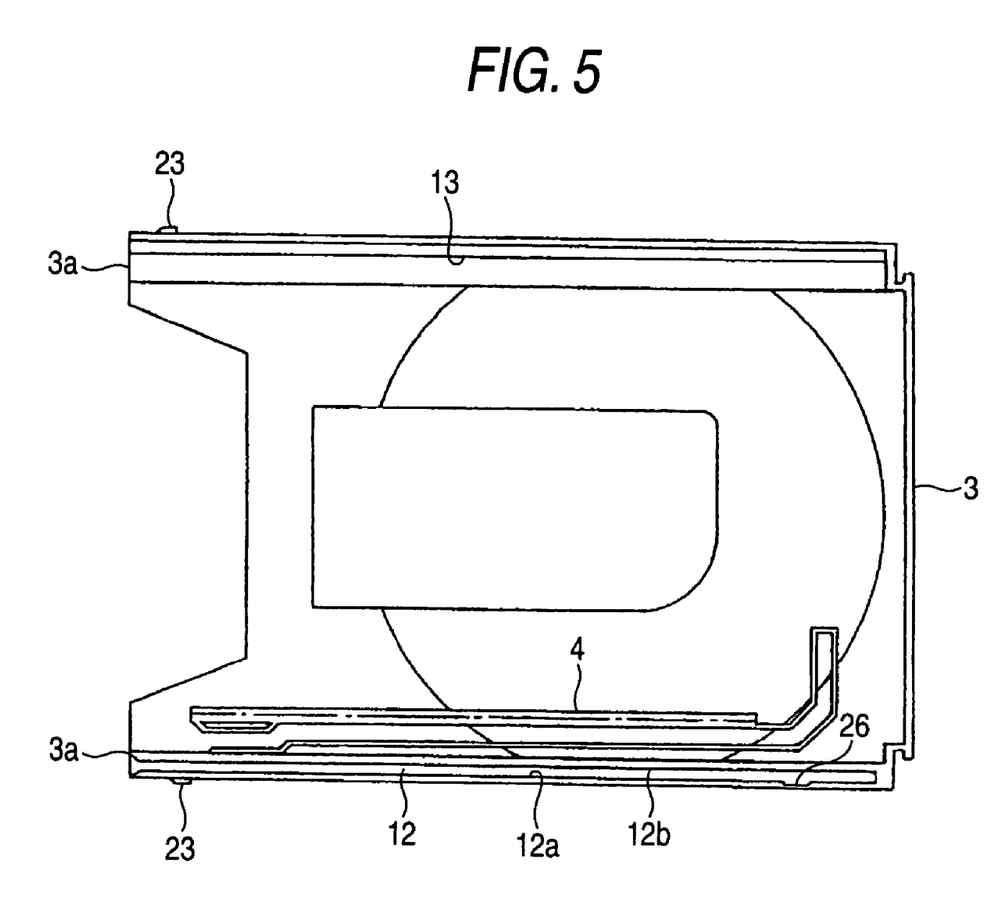
FIG. 5 is a bottom view of a tray of the same.

Further, since the elastic plate 6 is integrated into the cabinet, regardless of the elastic plate 6, the disk player can be downsized by making the length of the cabinet 1 shorter and ensuring a rear space 8a between the casing 8 and the cabinet 1 to contain an electric part E in the rear space 8a as shown by FIG. 2.

Explaining the unloading operation and containing the tray 3 within the cabinet 1 as shown by bold lines in FIG. 1 and FIG. 2, as shown by FIG. 7, the projected portion 6A in the circular arc shape of the elastic plate 6 is made to be opposed to the recess portion 26, no load is applied to the elastic plate 6 and therefore, there is no concern of reducing the elastic force of the elastic plate 6.

Next, by receiving an unloading signal, the cam plate 21 is slid, the drive chassis 16 is lifted down around the pivoting shaft 17, a disk D on the turn table 19 is mounted on the tray 3, successively, by slightly moving the tray 3 forward a, the rack 4 is brought in mesh with the pinion 5, and the tray 3 is moved forward a by rotating the pinion 5 in the c direction (refer to imaginary lines of FIG. 1 and FIG. 2).

In this case, as shown by FIG. 10, the projected portion 6A in the circular arc shape of the elastic plate 6 is brought into elastic contact with the one side face 12a of the guide groove 12, the other face of the guide groove 12 is brought into contact with the reference side faces 10a through 10d of the respective guide pieces 10A through 10D and therefore, the tray 3 is moved forward a along the reference side faces 10a through 10d such that the tray 3 is not inclined and the appearance of operation is improved.

Figure 9:
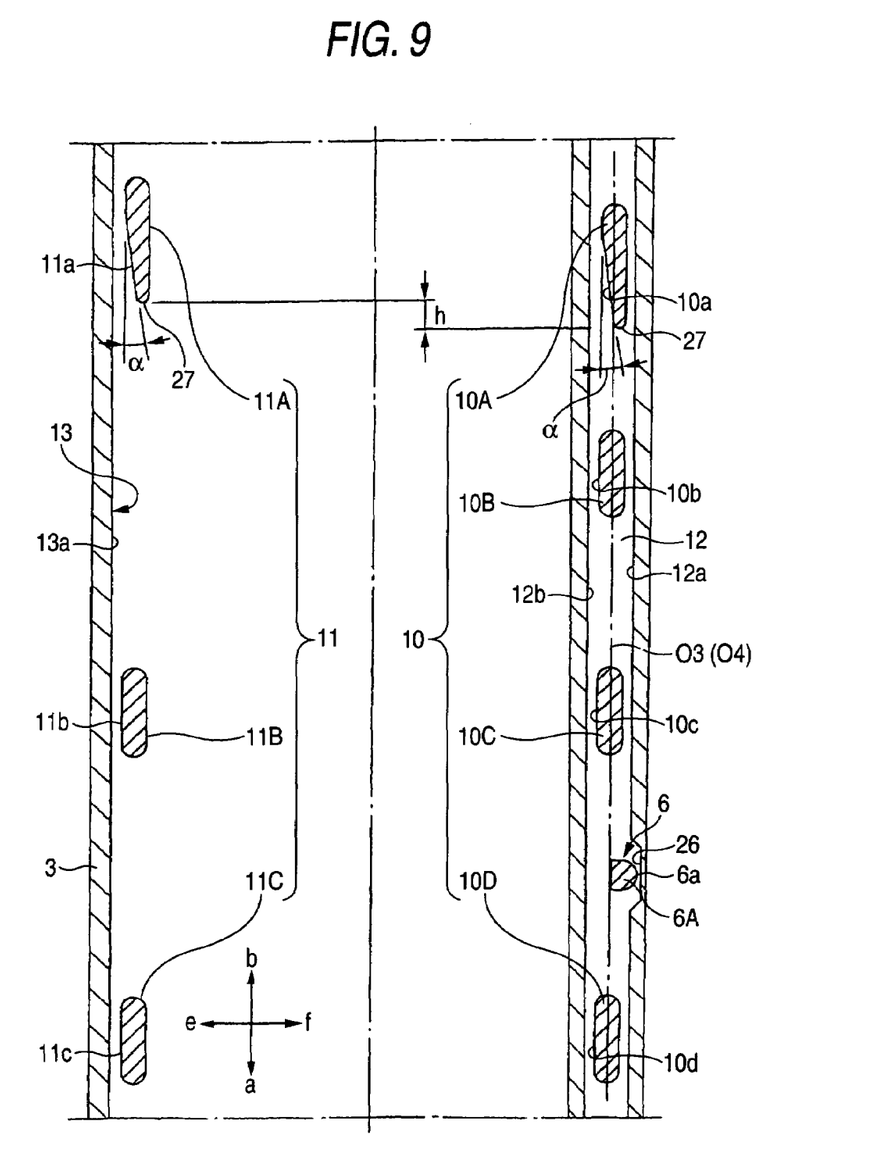
FIG. 9 is an outline horizontal sectional view of a state of containing the tray in the cabinet.
Figure 11A:
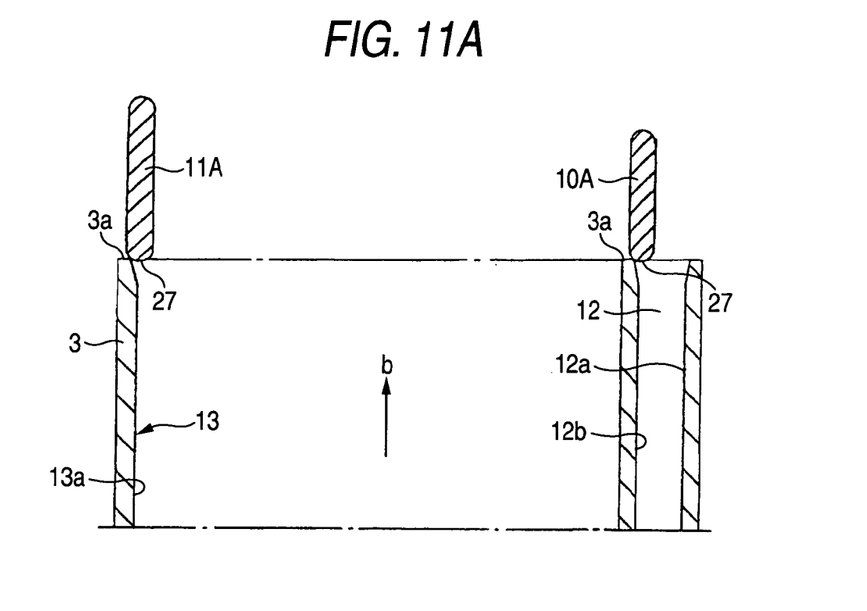
FIG. 11A is an outline horizontal sectional view of a comparative example when the tray is moved rearward.
Figure 11B:
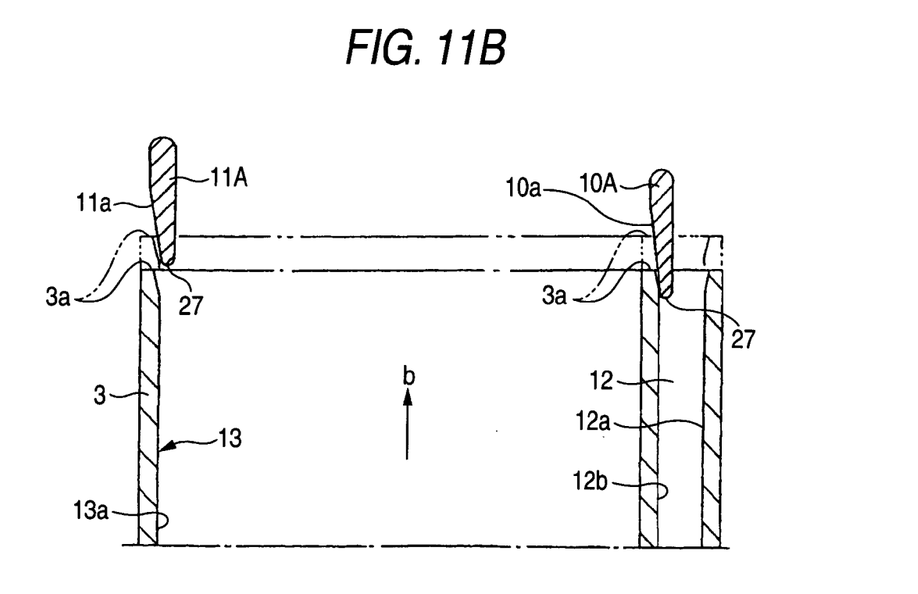
FIG. 11B is an outline horizontal sectional view of an essential portion of the invention when the tray is moved rearward.

What is important here is that as shown by FIG. 10, by bringing the other side face 12b of the guide groove 12 substantially in the U-like shape into contact with the reference side faces 10a through 10d by the elastic force of the elastic plate 6, the tray 3 is shifted laterally in the f direction by eccentrically shifting a center axis O4 of the guide groove 12 substantially in the U-like shape relative to a center axis O3 of the guide pieces 10A through 10D on one side and therefore, as shown by a comparative example of FIG. 11A, there is a concern of hampering the tray 3 from being contained within the cabinet 1 by bringing rear end edges 3a of the tray 3 moving rearward b based on the loading signal into contact with front end faces 27 of the both guide pieces 10A, 11A at rearmost ends thereof, however, according to the embodiment, the front end faces 27 of the both guide pieces 10A, 11A at the rearmost ends are positionally shifted from each other by a predetermined interval h along the forward and rearward directions a, b (refer to FIG. 9) and therefore, as shown by FIG. 11B, the rear end edges 3a of the tray 3 moving rearward b are not simultaneously brought into contact with the front end faces 27 of the guide pieces 10A, 11A, the tray 3 can smoothly be moved rearward b, and the tray 3 can smoothly be contained within the cabinet 1 since the reference side faces 10a, 11a of the both guide pieces 10A, 11A at the rearmost ends are inclined to separate from the guide faces 12b, 13a of the guide grooves 12, 13 in the forward direction.

According to a first aspect of the invention, in containing the tray in the cabinet, the recess portion formed at the one face of the one guide groove is opposed to the projected portion in the circular arc shape of the elastic plate, since the elastic plate is not applied with a load, there is not a concern of reducing an elastic force of the elastic plate.

When the tray is moved forward, the side face of one guide groove is brought into elastic contact with the projected portion in the circular arc shape, the side face of the other guide groove is brought into contact with the reference side face of the one guide member, the tray can be moved forward along the reference side face such that the tray is not inclined and appearance is improved.

The elastic plate is integrally projected at the front side lateral beam portion, by inserting the rear end of the tray into the cabinet, the projected portion in the circular arc shape of the elastic plate can immediately be inserted into one guide groove and therefore, when the tray is inserted into the cabinet by swinging in a left and right direction, there is not a concern of damaging or bending the elastic plate and reducing the elastic force as in the prior art.

Since the elastic plate is integrated into the cabinet, regardless of the elastic plate, the disk player can be downsized by making the cabinet shorter.

The other face of the guide groove is brought into contact with the reference side face of one guide member by the elastic force of the elastic plate. The tray is shifted laterally and therefore, rear end edges of the tray moving rearward are brought into contact with front end faces of the guide pieces at rearmost ends and there is a concern of hampering a tray from being contained within the cabinet. However, according to the invention, front end faces of the guide pieces at the rearmost ends are positionally shifted from each other along the forward and rearward moving directions and therefore, the rear end edges of the tray moving rearward are not simultaneously brought into contact with the front end faces of the both guide pieces at the rearmost ends, the tray can smoothly be moved rearward, the reference side faces of the guide pieces at the rearmost ends are inclined to separate from the side faces of the guide grooves in the forward direction and therefore, the tray can smoothly be contained in the cabinet.

Since the elastic plate is formed substantially in the J-like shape, by bringing the projected portion in the circular arc shape of the elastic plate into contact with the one side face of the one guide groove, the predetermined elastic force is produced by totally bending the elastic plate and the tray can be moved forward and rearward by the elastic force such that the tray is not inclined.

By integrally projecting the projected portion in the circular arc shape at the side face of the front end of the elastic plate, the front end portion of the elastic plate is thickened and therefore, the elastic force can firmly be transmitted from the elastic plate to the tray via the thickened front end portion, by bringing the circular arc face of the projected portion in the circular arc shape into point contact with the tray, the contact resistance can be reduced and therefore, there is not a concern that the projected portion in the circular arc shape constitutes a significant hazard in moving the tray forward and rearward and the tray can smoothly be moved forward and rearward.

According to a second aspect of the invention, in the state of containing the tray in the cabinet, the recess portion formed at one side face of one guide groove is opposed to the elastic plate, the elastic plate is not applied with a load and therefore, there is not a concern of reducing the elastic force of the elastic plate.

Further, when the tray is moved forward, one side face of one guide groove is brought into elastic contact with the elastic plate, the other side face of the guide groove is brought into contact with the reference side face of one guide member by the elastic force of the elastic plate and therefore, the tray can be moved forward along the reference side face such that the tray is not inclined and the appearance is improved.

Further, the elastic plate is integrally projected at the front portion of the cabinet, by inserting the rear end of the tray into the cabinet, the front end portion of the elastic plate is immediately inserted into one guide groove and therefore, when the tray is inserted into the cabinet while swinging in a left and right direction, there is not a concern of damaging or bending the elastic plate to reduce the elastic force as in the prior art.

Further, since the elastic plate is integrated into the cabinet, regardless of the elastic plate, the disk player can be downsized by making a length of the cabinet shorter.

According to a third aspect of the invention, the other side face of the guide groove is brought into contact with the reference side face of one guide member by the elastic force of the elastic plate, the tray is shifted laterally and therefore, rear end edges of the tray moving rearward are brought into contact with front end faces of the both guide pieces at rearmost ends and there is a concern that the tray is hampered from being contained into the cabinet, however, according to the invention, front end faces of the guide pieces at the rearmost ends are shifted from each other along the forward and rearward moving directions and therefore, the rear end edges of the tray moving rearward are not simultaneously brought into contact with the front end faces of the both guide pieces at the rearmost ends and the tray can smoothly be moved rearward.

According to a fourth aspect of the invention, the reference side faces of the both guide pieces at the rearmost ends are inclined to separate from the side faces of the guide groove in the forward direction and therefore, the tray can smoothly be contained into the cabinet.

According to a fifth aspect of the invention, since the elastic plate is formed substantially in the J-like shape, by bringing the front end of the elastic plate into contact with the side face of one guide groove, the predetermined elastic force is produced by totally bending the elastic plate and the tray cans be moved forward and rearward by the elastic force such that the tray is not inclined.

According to a sixth aspect of the invention, by integrally projecting the projected portion in the circular arc shape at the side face of the front end of the elastic plate, the front end portion of the elastic plate is thickened and therefore, the elastic force can firmly be transmitted from the elastic plate to the tray via the thickened front end portion, the contact resistance is reduced by bringing the circular arc face of the projected portion in the circular arc shape into point contact with the tray and therefore, there is not a concern that the projected portion in the circular arc shape constitutes a significant hazard in moving the tray a forward and rearward and the tray can smoothly be moved forward and rearward.

What is claimed is:

1. A disk player comprising:
   a cabinet (1) made of a synthetic resin including;
   a first side plate (2a);
   a second side plate (2b);
   a front side lateral beam portion (14a) and a rear side lateral beam portion (14b) which are provided between the first and second side plates (2a, 2b);
   an elastic plate (6) substantially formed in J-like shape in cross section and integrally projected from the front side lateral beam portion (14a), and the elastic plate (6) with a projected portion (6A) having circular arc like shape to be integrally projected from a side face of a front end of the elastic plate (6);
   a right guide member (10) including at least one reference side face (10a, 10b, 10c, 10d) and a plurality of guide pieces (10A, 10B, 10C, 10D) along with forward and rearward directions and a left guide member (11) including at least one reference side face (11a, 11b, 11c) and a plurality of guide pieces (11A, 11B, 11C) along with the forward and rearward directions;
   a tray (3) made of a synthetic resin movable along the forward and rearward directions at the first and second side plates (2a, 2b), the tray (3) including;
   a right guide groove (12) having a first side face (12a) and a second side face (12b), provided at a right side edge of a lower surface of the tray (3), substantially formed in U-like shape in cross section, and fitted to the right guide member (10) of the cabinet (1); and
   a left guide groove (13) provided at a left side edge of the lower surface of the tray (3), substantially formed in L-like shape in cross section, and fitted to the left guide member (11) of the cabinet (1);
   a rack (4) formed at a vicinity of the side edge of a lower surface of the tray (3) along a forward and rearward directions; and
   a pinion (5) provided to be opposed to the rack (4), wherein
   a recessed portion (26) is formed at a position where the projected portion (6A) is opposed to the first side face (12a) of the right guide groove (12) in a state that the tray (3) is accommodated with the cabinet (1) when the projected portion (6A) of the elastic plate (6) is inserted into the right guide groove (12),
   the plurality of the guide pieces (10A, 10B, 10C, 10D, 11A, 11B, 11C) are configured such that the second side face (12b) of the right guide groove (12) is in contact with at least one of the reference side faces (10a, 10b, 10c, 10d) of the right guide member (10) by bringing the projected portion (6A) opposed to the recessed portion (26) into elastic contact with the first side face (12a) of the right guide groove (12) while the tray (3) is moving toward the forward direction via the rack (4) by rotating the pinion (5) on the basis of an unloading signal of the disk player, so that the tray (3) is not inclined,
   front end faces (27, 27) of the guide pieces (10A, 11A) at rearmost ends are positionally shifted from each other along the forward and rearward directions, and
   the reference side surfaces (10a, 11a) of the right and left guide pieces (10A, 11A) at rearmost ends are inclined to separate from the side faces (12a, 13a) of the right and left guide grooves (12, 13) in the forward direction.

2. A disk player comprising:
   a cabinet (1) made of a synthetic resin including a first side plate portions (2a) and a second side plate (2b);
   a tray (3) made of a synthetic resin, arranged movably along a forward and rearward direction between the first and second side plate portions (2a, 2b) of the cabinet (1), the tray (3) including;
   a rack (4) formed at a vicinity of one side edge of a lower face of the tray (3) along the forward and rearward directions, wherein
   a pinion (5) is provided at the cabinet (1) to be opposed to the rack (4),
   the tray (3) is moved forward by rotating the pinion (5) via the rack (4) based on an unloading signal,
   a front end portion of an elastic plate (6) integrally projected at a front portion of the cabinet is inserted into a right guide groove (12) formed substantially in a U-like shape, and a left guide groove (13) at a right and a left side edge of the lower surface of the tray (3) and fitted to a pair of right and left guide members (10, 11) of the cabinet (1),
   a recess portion (26) is formed at a portion of a first side face (12a) of the right guide groove (12) opposed to the elastic plate (6) in a state of containing the tray (3) into the cabinet (1), and by bringing the first side face (12a) of the right guide groove (12) into elastic contact with the elastic plate (6) opposed to the recess portion (26) in moving forward the tray (3),
   the first side face (12a) of the right guide groove (12) is brought into contact with at least one reference side face (10a, 10b, 10c, 10d) of the right guide member (10) to prevent the tray (3) from being inclined.

3. The disk player according to claim 2, wherein
   a pair of front end faces (27, 27) of a pair of guide pieces (10A, 11A) at rearmost ends are positionally shifted from each other along the forward and rearward directions and a plurality of guide pieces (10A, 10B, 10C, 10D, 11A, 11B, 11C) forming the respective guide members (10, 11) and aligned along the forward and rearward directions.

4. The disk player according to claim 3, wherein the reference side faces (10a, 11a) at the rearmost ends are inclined to separate from the side faces of the right and left guide grooves in the forward direction.

5. The disk player according to claim 2, wherein the elastic plate (6) is formed substantially in a J-like shape.

6. The disk player according to claim 2 wherein
   a projected portion (6A) in a shape of a circular arc is integrally projected at a side face of a front end of the elastic plate (6), and
   the first side face (12a) of the right guide groove (12) is brought into elastic contact with a circular arc face of the projected portion (6A).

* * * * *